(12) United States Patent
Firmian

(10) Patent No.: US 11,333,280 B2
(45) Date of Patent: May 17, 2022

(54) JOINING METAL FITTINGS TO A POLYMER COMPOSITE PIPE

(71) Applicant: Subsea 7 (US) LLC, Houston, TX (US)

(72) Inventor: Michael Firmian, Houston, TX (US)

(73) Assignee: Subsea 7 (US) LLC, Houston, TX (US)

(*) Notice: Subject to any disclaimer, the term of this patent is extended or adjusted under 35 U.S.C. 154(b) by 0 days.

(21) Appl. No.: 16/955,747

(22) PCT Filed: Dec. 18, 2018

(86) PCT No.: PCT/US2018/066321
§ 371 (c)(1),
(2) Date: Jun. 18, 2020

(87) PCT Pub. No.: WO2019/126230
PCT Pub. Date: Jun. 27, 2019

(65) Prior Publication Data
US 2020/0378537 A1 Dec. 3, 2020

(30) Foreign Application Priority Data
Dec. 19, 2017 (GB) ..................................... 1721299

(51) Int. Cl.
*F16L 33/22* (2006.01)
*F16L 47/14* (2006.01)
*F16L 23/036* (2006.01)

(52) U.S. Cl.
CPC ............. *F16L 33/222* (2013.01); *F16L 47/14* (2013.01); *F16L 23/036* (2013.01)

(58) Field of Classification Search
CPC ................................. F16L 33/222; F16L 47/14

USPC .................................................. 285/249, 255
See application file for complete search history.

(56) References Cited

U.S. PATENT DOCUMENTS

| 1,852,962 | A | * | 4/1932 | Farr | F16L 33/222 |
| 1,853,584 | A | * | 4/1932 | Stoddard | F16L 33/222 |
| 1,887,877 | A | * | 11/1932 | Shaffer | F16L 33/222 |
| 2,880,020 | A | * | 3/1959 | Audette | F16L 33/222 |
|  |  |  |  |  | 285/255 |

(Continued)

FOREIGN PATENT DOCUMENTS

| DE | 1 163 620 | 2/1964 |
| DE | 1 263 417 | 3/1968 |

(Continued)

OTHER PUBLICATIONS

API Specification 17J, "Specification for Unbonded Flexible Pipe," American Petroleum Institute, Jan. 2009.

(Continued)

*Primary Examiner* — Zachary T Dragicevich
(74) *Attorney, Agent, or Firm* — Levy & Grandinetti

(57) ABSTRACT

A fitting is attached to a composite pipe by inserting a tubular root portion of the fitting into an end of the pipe and then tensioning longitudinally-extending tensile elements distributed around the fitting. This moves an outer wedge component of the fitting longitudinally relative to the pipe to force an opposed inner wedge formation radially inwardly toward the roof portion, clamping the fitting to the pipe. The fitting may be an end fitting to enable the pipe to be joined to another pipe or conduit, or may be an in-line fitting used to join two lengths of pipe end-to-end.

12 Claims, 4 Drawing Sheets

(56) References Cited

U.S. PATENT DOCUMENTS

| | | | | |
|---|---|---|---|---|
| 2,940,778 | A | * | 6/1960 | Kaiser .......................... 285/255 |
| 3,189,370 | A | * | 6/1965 | Marshail ...................... 285/255 |
| 4,229,029 | A | | 10/1980 | Boyer et al. |
| 4,634,153 | A | * | 1/1987 | Kishton ................ F16L 33/222 285/255 |
| 6,923,477 | B2 | | 8/2005 | Buon et al. |
| 2007/0272417 | A1 | | 11/2007 | Benson |
| 2015/0027720 | A1 | | 1/2015 | Spencer et al. |

FOREIGN PATENT DOCUMENTS

| | | |
|---|---|---|
| EP | 2 440 738 | 12/2010 |
| FR | 1236595 | 7/1960 |
| FR | 2 398 249 | 2/1979 |
| GB | 2 258 899 | 2/1993 |
| KR | 10-1025542 | 4/2011 |
| WO | WO 01/98701 | 12/2001 |
| WO | WO 02/39003 | 5/2002 |
| WO | WO 2007/027089 | 3/2007 |
| WO | WO 2012/095631 | 7/2012 |
| WO | WO 2012/115350 | 8/2012 |
| WO | WO 2014/023943 | 2/2014 |
| WO | WO 2017/163021 | 9/2017 |

OTHER PUBLICATIONS

API Specification 5L, "Specification for Line Pipe," American Petroleum Institute, Dec. 2012.

API Recommended Practice 17B, "Recommended Practice for Flexible Pipe," American Petroleum Institute, 5th ed. May 2014.

API Recommended Practice 1111, "Design, Construction, Operation, and Maintenance of Offshore Hydrocarbon Pipelines," American Petroleum Institute, Sep. 2015.

\* cited by examiner

JOINING METAL FITTINGS TO A POLYMER COMPOSITE PIPE

BACKGROUND OF THE INVENTION

This invention relates to the challenges of connecting a metal end fitting, termination or joint to a pipe of polymer composite material.

Conventional rigid pipes used in the subsea oil and gas industry are specified in the American Petroleum institute (API) Specification 5L and Recommended Practice 1111. A rigid pipe usually consists of, or comprises, at least one pipe of solid steel or steel alloy. However, additional layers of other materials can be added, such as an internal liner layer or an outer coating layer. A rigid pipe may also have a concentric pipe-in-pipe (PiP) structure. Rigid pipe joints are terminated by a bevel, a thread or a flange, and are assembled end-to-end by welding, screwing or bolting them together to form a pipe string or pipeline.

Those skilled in the art know that nominally rigid pipes have significant flexibility. However, rigid pipes do not fall within the definition of flexible pipes as understood in the art.

Flexible pipes used in the industry are specified in API Specification 17J and Recommended Practice 17B. The pipe body is composed of a composite structure of layered materials, in which each layer has its own function. In particular, bonded flexible pipes comprise bonded-together layers of steel, fabric and elastomer and are manufactured in short lengths in the order of tens of metres. Conversely, unbonded flexible pipes can be manufactured in lengths of hundreds of metres. Typically, polymer tubes and wraps ensure fluid-tightness and thermal insulation, whereas steel layers or elements provide mechanical strength.

Flexible pipes are terminated by end fittings, which are usually of steel. Such end fittings typically comprise a metal flange for bolted connection and a system to join the layers of the pipe fluid-tightly to the flange. An example is disclosed in WO 02/39003, where a flexible pipe is connected to a flanged end fitting.

In recent years, the subsea oil and gas industry has begun to adopt rigid pipes of polymer composite materials in place of steel. Composite pipes have a tubular load-bearing structure that is principally of composite materials. This is to be distinguished from pipes having a composite structure, such as the various layered configurations of rigid and flexible pipes mentioned above.

Typically, a composite pipe comprises a polymer resin matrix reinforced by fibres such as glass fibres or carbon fibres. The polymer matrix may be of thermoplastic or thermoset materials. The former results in what is known in the art as thermoplastic composite pipe or, more simply, as thermo-composite pipe (TCP). TCP is classed as a bonded composite pipe.

With reference to FIG. 1 of the drawings, the composite tube 10 of a TCP has a solid, monolithic structure comprising a polymer liner 12, a polymer composite matrix 14 and an optional outer coating 16 that may also be of polymer. The polymer of the liner 12, the matrix 14 and/or the coating 16 may, for example, be of polypropylene. The matrix 14 is a true composite reinforced with fully-embedded reinforcing fibres.

Composite pipes such as these are being used increasingly in the subsea oil and gas industry to convey production fluids or other fluids. For example, such pipes may be used as offshore flowlines, risers or downlines, or as spools, jumpers or tie-ins to connect together items of equipment in a subsea installation. Also, some PiP systems employ both steel and composite pipes in concentric relation, the composite pipe typically being a flowline within a surrounding steel pipe.

An advantage of composite pipes is that they can be made continuously any installable length, unlike steel pipelines that require fabrication from multiple shorter pipe joints. In this regard, composite pipes have a smaller minimum bend radius than equivalent steel pipes and so are particularly apt to be spooled, with elastic deformation, onto a reel or carousel of a reel-lay installation vessel.

Whilst they may be of great length, for example longer than 3 km, polymer composite pipes must eventually be connected end-to-end to other pipes or to equipment incorporating other pipes or similar tubular conduits. For example, a pipeline may incorporate in-line or terminal pipeline accessories, or a composite pipe may require connection to a different type of pipe that performs a different function. Such other pipes may be of any suitable material but are most commonly of steel.

The structure and composition of a pipe determines how mechanical and fluid connections are made between successive lengths of pipe to complete a pipeline. For steel pipes, for example, the conventional approaches are to girth-weld pipes end-to-end or to bolt together forged flanges. Analogously to welding, electrofusion is well known for joining together solid polymer pipes. However, special connection systems have to be used where the material of the pipe is not homogeneous, as in a composite pipe. For example, multiple cured, fibrous resin layers cannot be joined by electrofusion because that would create points of weakness.

Whilst other solutions such as couplers are known, the jointing of polymer bonded composite pipelines typically requires end fittings. It is a technical challenge to secure the end fittings to the composite tube in a leak-tight manner.

US 2015/027720 teaches the use of grooves in an end fitting to secure the fibres of the composite pipe. However, this connection method does not provide optimal leak-tightness.

WO 2007/027089 discloses the use of a coupling sleeve that ides around a tapered end of a composite pipe and secures an end fitting to it.

GB 2258899 shows how pipe fitting and a frusto-conical locking sleeve may be bolted together. Similarly, in WO 2017/163021, several pins lock the parts together. Also, EP 2440738 shows an arrangement of interlocking formations for a drill pipe, in which screws are used to lock the formations after assembling. All of these arrangements require the insertion and tightening of bolts, pins or screws. Also, prior art relating to drill pipes is concerned with resistance to torsion, whereas pipeline connections have to withstand longitudinal tension and compression and radial pressure.

In WO 01/98701, a metallic inner sleeve is expanded radially to press a composite pipe into inwardly-facing castellations of a surrounding pipe fitting. However, this arrangement substantially reduces the diameter of the inner bore of the pipeline, which is detrimental to flow rate and to circulation of pipeline pigs for cleaning and inspection.

In WO 2014/023943, the metallic part of a pipe fitting is secured to a composite pipe by a threaded arrangement. Conversely, WO 2012/095631 teaches gluing a fitting to a composite pipe by injecting adhesive material into a recess.

FR 1236595 shows a pipe fitting for joining adjacent pipes. The fitting uses inner and outer wedge components mounted on the adjacent pipes. Ring components are subsequently slid over the inner and outer wedge components and connected by a longitudinal fastening to urge the outer wedge toward the inner wedge to join the adjacent pipes.

DE 1263417 discloses a method of joining two pipes using a "plug and socket" type arrangement. The portion of the pipe that acts as the socket comprises an annular flange and the portion of the pipe that acts as the plug comprises an annular sleeve. The flange and sleeve are secured by a fastening thereby joining the pipes.

WO 2012/115350 discloses a method of joining pipe without an end flange to a pipe with an end flange. This document shows the use of an additional flange component secured to the pipe via a press fit.

US 2007/272417 shows a device for joining two pipes that have relatively large manufacturing tolerances. The device uses a cone and a slip that may be moved relative to each other by a piston to grip the pipe and account for any tolerances in the outer diameter of the pipe being gripped.

DE1183620 describes an attachment device for securing a high pressure hose to a nozzle. A clamping sleeve is used to clamp the hose to the nozzle. FR 2398249 describes a hose coupling for connecting a hose to a tubular sleeve.

The arrangements described above have several drawbacks. For example, the completed assembly has a large diameter and/or length, which is detrimental to the possibility of reel-lay installation. Also, their resistance to mechanical stress and fluid leakage may not be sufficient for use in deep water, under high internal and external pressures and when conveying fluids at high temperature. Finally, in at least some cases, the end of the composite pipe requires a special shape. This means that length adjustment cannot be effected simply by cutting the pipe and connecting the end fitting to the cut end.

FIG. 2 of the drawings shows an end portion of a composite pipe 18 comprising a steel end fitting 20 for a composite tube 10 as also known in the prior art. This addresses at least some of the drawbacks of the prior art arrangements identified previously.

The end fitting 20 comprises an elongate tubular stem 22, a wedge system 24 and a tubular sleeve 26 that cooperates with the wedge system 24 as will be described.

The stem 22 is an integral steel forging that is rotationally symmetrical about a central longitudinal axis 28 and that has a substantially constant internal diameter along its full length.

More specifically, the stem 22 extends distally from a root portion 30 at a proximal end to a custom coupling flange 32 at a distal end. The root portion 30 is for engaging the tube 10 to secure the end fitting 20 to the tube 10, whereas the coupling flange 32 is for attaching the pipe 18 to the next successive pipe 18 in series. For this purpose, the coupling flange 32 is penetrated by axially-extending holes 34 for bolted connection to a complementary flange 32. The coupling flange 32 is an example of a joint formation; other joint formations such as a weld neck or a thread would be possible instead.

The root portion 30 of the stem 22 is an interference fit within a distal end portion of the tube 10 and is sealed to the surrounding tube 10 by a series of circumferential gaskets 36. The remainder of the stem 22 extends distally beyond the distal end of the tube 10.

A locking flange 38, which conveniently beam against the distal end of the tube 10 as shown, is spaced proximally from the coupling flange 32 to enable bolts to be inserted through the holes 34 of the coupling flange 32.

The coupling flange 32 and the locking flange 38 lie in respective longitudinally-spaced planes that are orthogonal to the central longitudinal axis 28. Their outer diameters exceed the outer diameter of the tube 10.

The wedge system 24 comprises a circumferential array of, typically, between four and twelve metal wedges that are strapped around, and together encircle, the end portion of the tube 10 on the proximal side of the locking flange 38. The wedges react in friction with the external surface of the tube 10, as may be defined by an outer coating 16 where present.

Collectively, the wedges of the wedge system 24 define a distally red frusto-conical ramp formation. The ramp formation terminates distally within the radially outer diameter of the locking flange 38.

The sleeve 26 encircles the wedge system 24 and has a frusta-conical body 40. The body 40 defines an inclined internal surface 42 that complements the similarly-inclined external surface 44 of the ramp formation.

When the sleeve 26 is forced distally over the wedge system 24, the inclined internal surface 42 of the sleeve 26 slides over the complementary external surface 44 of the ramp formation. The resulting wedging action forces the wedges of the wedge system 24 radially inwardly. This squeezes the end portion of the tube 10 into tighter engagement with the root portion 30 of the stem 22 within.

A distal end ring 46 of the sleeve 26 overlaps the radially outer edge of the locking flange 38. The end ring 46 may have a female thread that engages a complementary male thread on the locking flange 38. Alternatively, as shown, fasteners such as bolts 48 extend on angularly-spaced radial axes through holes in the end ring 46 and into threaded holes in the locking flange 38. This locks the sleeve 26 in a distally-advanced position that, in turn, locks the wedges of the wedge system 24 to press radially inwardly against the outside of the tube 10. Thus, the root portion 30 of the stem 22 within the tube 10, and hence the remainder of the end fitting 20, are fixed securely relative to the tube 10.

A disadvantage of the arrangement shown in FIG. 2 is that the end ring 46 of the sleeve 26 add to the diameter of the assembly where there is overlap between the sleeve 26 and the locking flange 38. Where used, the bolts 48 add further to the diameter of the assembly. The resulting radial bulk of the end fitting 20 hinders use of the pipe 18 as the inner flowline of a pipe-in-pipe (PiP) system. Also, a secondary actuator system has to be used to force the sleeve 26 distally over the wedge system 24 before the end ring 46 of the sleeve 26 can be engaged with the locking flange 38.

BRIEF SUMMARY OF THE INVENTION

Against his background, one aspect of the invention provides a fitting for a composite pipe. The fitting comprises: at least one tubular root portion; an outer wedge component, such as a sleeve that encircles the root portion, that is movable longitudinally relative to the root portion to force an opposed inner wedge formation radially inwardly toward the root portion to clamp the composite pipe between the inner wedge formation and the root portion: and one or more longitudinally-extending tensile elements that act in tension on the outer wedge component to effect said longitudinal movement.

The number and disposition of the tensile elements is selected to apply sufficient longitudinal force to the outer wedge component. In some embodiments, one tensile element may be sufficient but a balanced application of longitudinal force to the outer wedge component may require more tensile elements. For example, there may be two or more longitudinally-extending tensile elements distributed around the root portion in a circumferential array.

In one approach, the inner wedge formation may extend circumferentially around, and be spaced radially from, the root portion to define an annular clamping gap that, in use, accommodates a wall of the pipe. In another approach, the inner wedge formation may be integral with or attached to the pipe.

The tensile elements ray comprise one or more rods, bolts, studs or straps, which elements could be used in any combination. A tensile element may comprise a tensioner or fastening that is offset proximally with respect to, and located on an outer proximally-tapering side of, the outer wedge component.

The or each tensile element extends along a respective passageway that extends longitudinally through the outer wedge component and the inner wedge formation. One or more such passageways may also extend longitudinally through a flange that extends radially in a plane offset longitudinally from the root portion.

In some embodiments, the fitting may be an end fitting having a joint formation that is disposed distally with respect to the root portion. In that case, the or each tensile element may act between anchorages disposed respectively on the outer wedge component and on a stem portion that extends distally from the root portion.

An integral tubular stem component may define the root portion at a proximal end, the joint formation at a distal end and a flange extending radially outwardly between those ends. Conveniently, the flange may locate the inner wedge formation against longitudinal movement. The or each tensile element may extend between the outer wedge component and the flange.

In other embodiments, the fitting may be a joint fitting for coupling two pipes end-to-end. In that case, the fitting may comprise: a pair of root portions extending in mutually-opposed longitudinal directions; and an outer wedge component disposed radially outwardly of each of the pair of root portions, those outer wedge components being movable by the or each tensile element in opposed longitudinal directions to force radially-inward movement of respective inner wedge formations.

An integral tubular stem component may define the root portions at opposed ends and have a flange extending radially outwardly between those ends. Again, the flange conveniently locates the inner wedge formations against longitudinal movement, and the or each tensile element may act between an outer wedge component and the flange. Alternatively, the or each tensile element may connect and act between the oppositely-movable outer wedge components.

The inventive concept embraces a composite pipe fitted with at least one fitting of the invention. The inventive concept also embraces a corresponding method of attaching a fitting to at least one composite pipe, the method comprising: inserting a tubular root portion of the fitting into an end of the or each pipe; and by tensioning one or more longitudinally-extending tensile elements of the fitting, moving an outer wedge component of the fitting longitudinally relative to the pipe to force an opposed inner wedge formation radially inwardly toward the root portion thereby clamping the end of the or each pipe between the inner wedge formation and the root portion. Again, there may be a plurality of tensile elements distributed around the pipe.

Where the inner wedge formation is a part of the fitting, a wall of the pipe may be clamped between the inner wedge formation and the root portion. Alternatively, where the inner wedge formation is integral with or attached to the pipe, the inner wedge formation may be clamped between the outer wedge component and the root portion.

Force is applied to the outer wedge component via one or more tensile elements ding through the inner wedge formation.

Tensile forces may be applied between the outer wedge component and a part of the such as a flange or stem portion, that is in fixed relation to the root portion.

Where the invention is used to affix an end fitting to the pipe, the method suitably further comprises attaching the pipe to another pipe or conduit via the end fitting. Alternatively, where the invention is used to couple two pipes end-to-end, the method suitably comprises: inserting oppositely-extending tubular root portions of the fitting into mutually-opposed ends of the respective pipes; and tensioning the or each tensile element to pull outer wedge components of the fitting toward each other in opposed longitudinal directions, those outer wedge components being disposed radially outwardly of each of the root portions to force radially-inward movement of respective inner wedge formations. In this case, the or each tensile element may act between the oppositely-movable outer wedge components.

The invention aims to reduce the overall outer diameter of pipe fitting such as an end fitting assembly. The reduction in outer diameter may exclude a custom flange used to join one end fitting to another. The same principles can be used for a single TCP termination and for a TCP-to-TCP connection, that is, an in-line connection. In the case of an in-line connection, the fitting could be modified to remove the flange entirely.

A modification to the prior art design shown in FIG. 2 is to change the load path between the wedges and the stem, noting that the load path extends only through the sleeve in the prior art design. In the invention, the load instead goes through some fasteners instead such as bolts, rods or straps. Such straps may, for example, be of Kevlar or titanium. This allows the shape of the sleeve to be modified, making it more compact in terms of its overall outer diameter.

The invention offers the possibility to reduce the overall outer diameter of the fitting and to shorten the overall length of a connection assembly. In addition to geometrical savings, this also saves the time and cost associated with a flanged or welded connection.

The invention particularly facilitates the use of TCP as the inner pipe of a PiP system, in which the TCP may be allowed to slide inside the outer pipe, or for other applications with geometrical constraints. In this respect, by reducing the overall size, and especially the outer diameter of known TCP end fittings, the invention extends the application of TCP not just to PiP systems but also to riser pull-ins in small-bore J- or I-tubes.

In addition to removing the need for flange in an in-line connection, the invention allows a much shorter assembly. This beneficially mitigates stress concentration caused by a local increase in bend stiffness.

Some embodiments of the invention provide an end-fitting for composite pipe, the end-fitting comprising: an end piece having at least one tube inserted into the end of the composite pipe and an end collar around the tube; a wedge ring that compresses the composite pipe onto the tube of the end piece and that abuts to the end collar; and a securing assembly for pressing and securing the wedge ring onto the composite pipe and the end piece, wherein the securing assembly comprises a sleeve able to slide on the wedge ring, and at least one fastener to longitudinally tension the sleeve on the wedge ring and to secure the sleeve to the end piece.

The composite pipe may be of polymer bonded composite and the end piece may be of steel. The end piece may comprise a flange for connecting two end fittings together.

The wedge ring or inner wedge may be integral with or bonded to the composite pipe. Alternatively, the interface between the wedge ring and the composite pipe may have a high coefficient of friction. Preferably, the outer diameter of the assembly of the sleeve and the wedge ring is smaller than the outer diameter of the end collar.

The fastener may be a nut and bolt assembly or a strap. Thus, tensioning the assembly of the sleeve and the wedge ring may be done by tensioning the bolt or the strap.

Some embodiments of the invention also implement a method to assemble an end-fitting to a composite pipe. That method comprises: inserting the composite pipe into a recess of a ring-shaped end-piece that comprises an external end collar; abutting a wedge ring located around the composite pipe to the end collar; sliding a sleeve of a securing assembly around the wedge ring to compress the wedge ring and the composite pipe radially onto the end-piece; and longitudinally tensioning a fastener of the securing assembly to slide the sleeve to compress the wedge ring and to lock the sleeve onto the wedge ring.

Other embodiments of the invention implement a method to connect to composite pipes. That method comprises: providing two composite pipes with respective end fittings each comprising at least one end piece and a wedge ring, wherein each end piece comprises only an end tube and an end collar; sliding a securing sleeve around each wedge ring; and longitudinally tensioning at least one fastener that connects the respective securing sleeves of each pipe. As above, tensioning may, for example, be achieved by tensioning a nut and bolt or a strap.

The invention facilitates the adoption of a standard geometry for pipeline fittings that reduces onshore engineering costs and the costs of fabrication and buoyancy; indeed, no buoyancy will be required in many cases. The simple geometry of the fittings makes them easy to weld and to insulate.

The fittings of the invention reduce transport costs because they are spoolable and can be transported on reels, which enables more pipe can be transported in a single operation. The compactness of the fittings allows for reduced installation costs by requiring a lower-specification installation vessel and the possibility of multiple methods of deployment.

In summary, the invention provides for tin to fitting to be attached to a composite pipe by inserting a tubular root portion of the fitting into an end of the pipe and then tensioning longitudinally-extending tensile elements distributed around the fitting. This moves an outer wedge component of the fitting longitudinally relative to the pipe to force an opposed inner wedge formation radially inwardly toward the root portion, clamping the fitting to the pipe. The tensile elements of the fitting are used both to apply longitudinal force to move the outer wedge component and to lock the system when the fitting has been clamped to the pipe.

The fitting may be an end fitting to enable the pipe to be joined to another pipe or conduit, or may be an it fitting used to join two lengths of pipe end-to-end.

BRIEF DESCRIPTION OF THE SEVERAL VIEWS OF THE DRAWINGS

To explain the prior art background, reference has already been made to FIGS. 1 and 2 of the drawings, in which.

Figure 3:
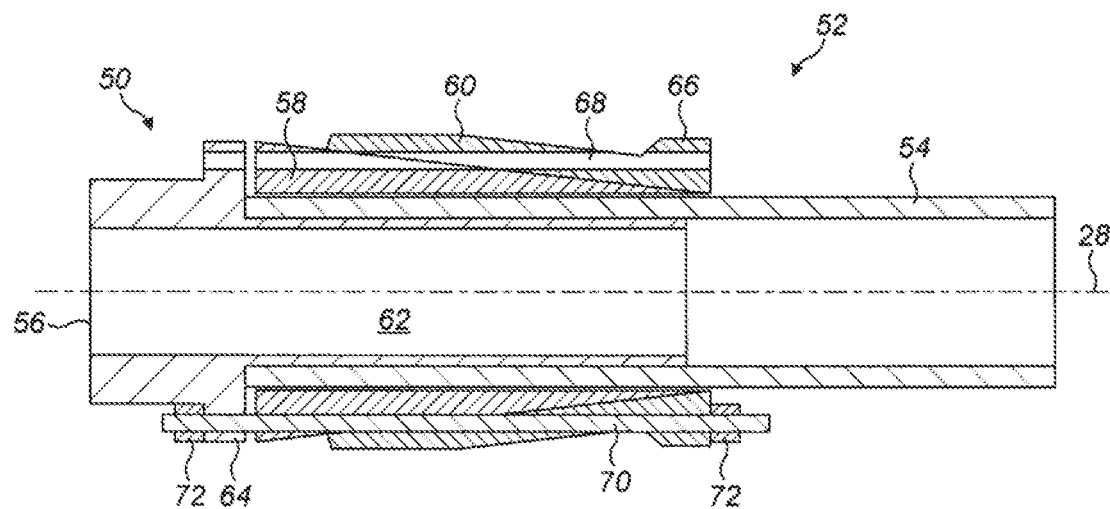
Figure 4:
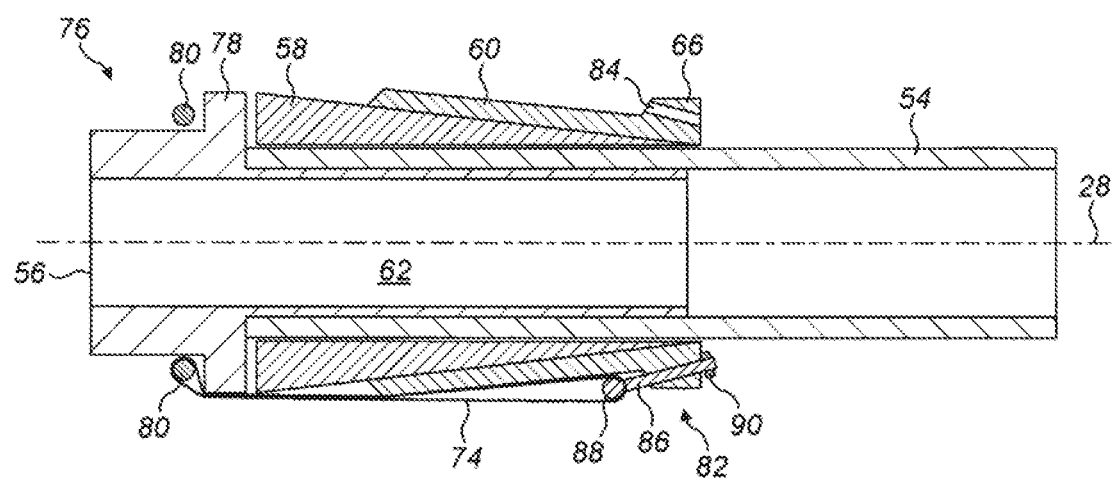
Figure 5:
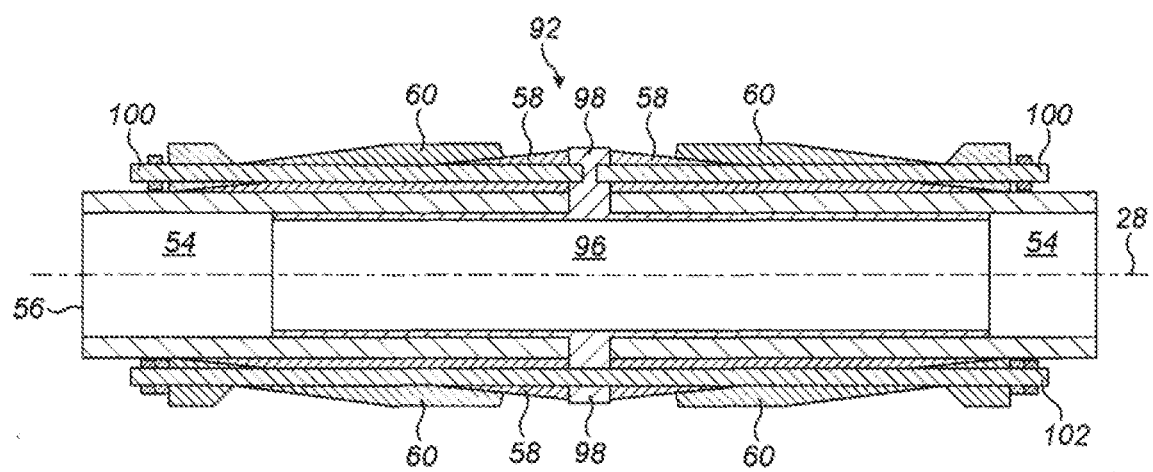
Figure 6:
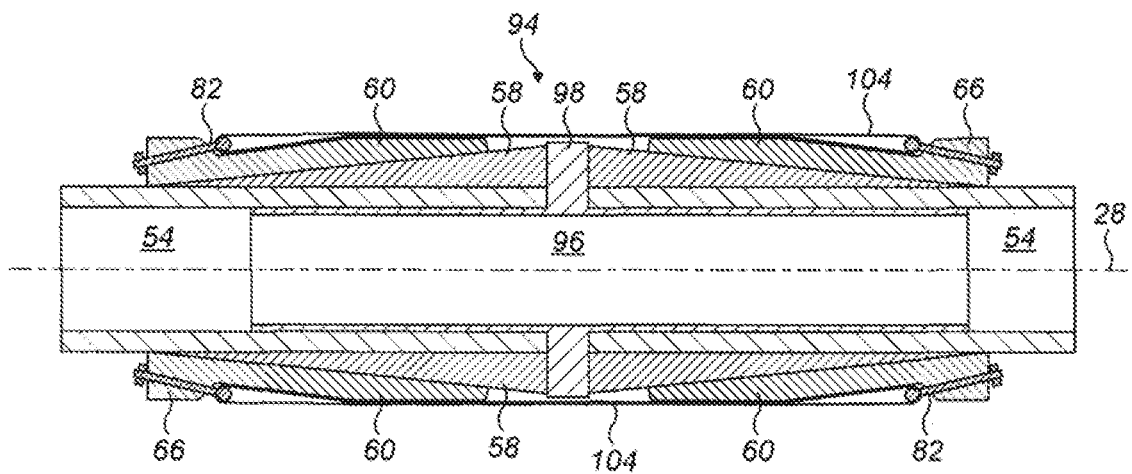

In order that the invention may be more readily understood, reference will now be made, by way of example, to the remainder of the accompanying drawings, in which:

FIG. 3 is a side view in longitudinal section of an end fitting joined to a composite tube in a first embodiment of the invention;

FIG. 4 is a side view in longitudinal section of an end fitting joined to a composite tube in a second embodiment of the invention;

FIG. 5 is a side view in longitudinal section of a joint joining two composite tubes in a third embodiment of the invention; and FIG. 6 is a side view in longitudinal section of a joint joining two composite tubes in a fourth embodiment of the invention.

Figure 7:
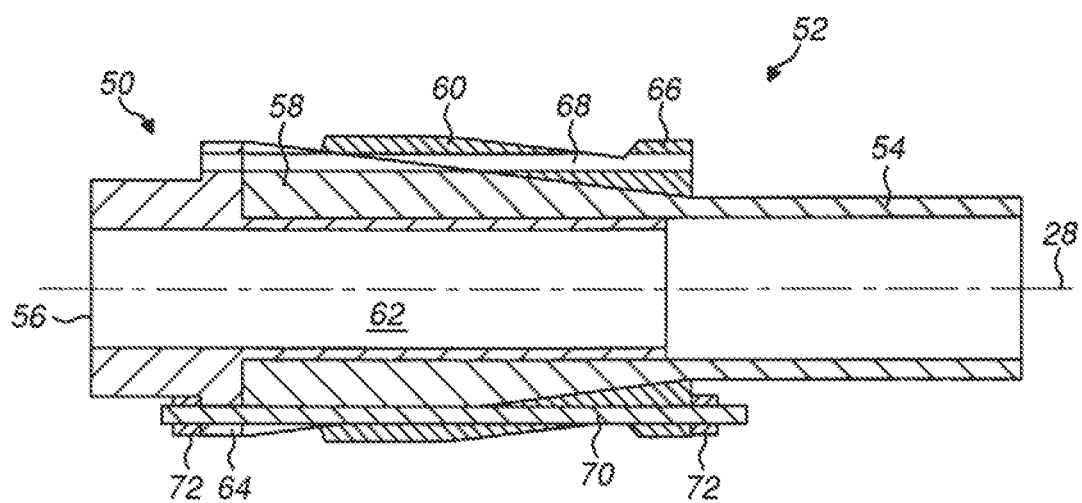

FIG. 7 is a side view in longitudinal section of an end fitting joined to a composite tube in a fifth embodiment of the invention.

DETAILED DESCRIPTION OF THE INVENTION

FIG. 3 shows a first embodiment of the invention in the form of a steel end fitting 50 for a composite pipe 52. The pipe 52 shown in FIG. 3 further comprises a composite tube 54.

Figure 1:
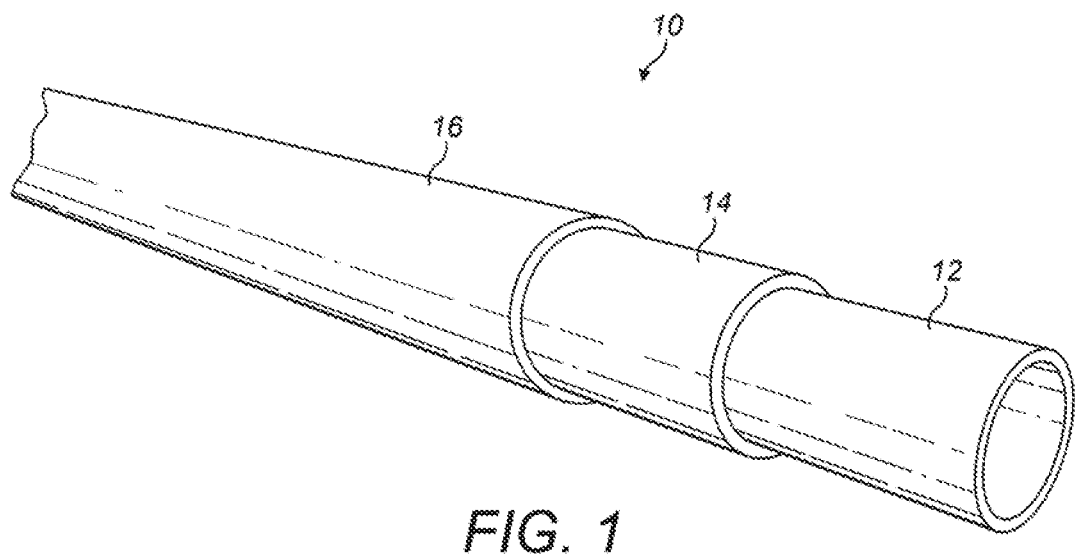
FIG. 1 is a perspective view of a composite tube fora composite pipeline as known in the prior art.
Figure 2:
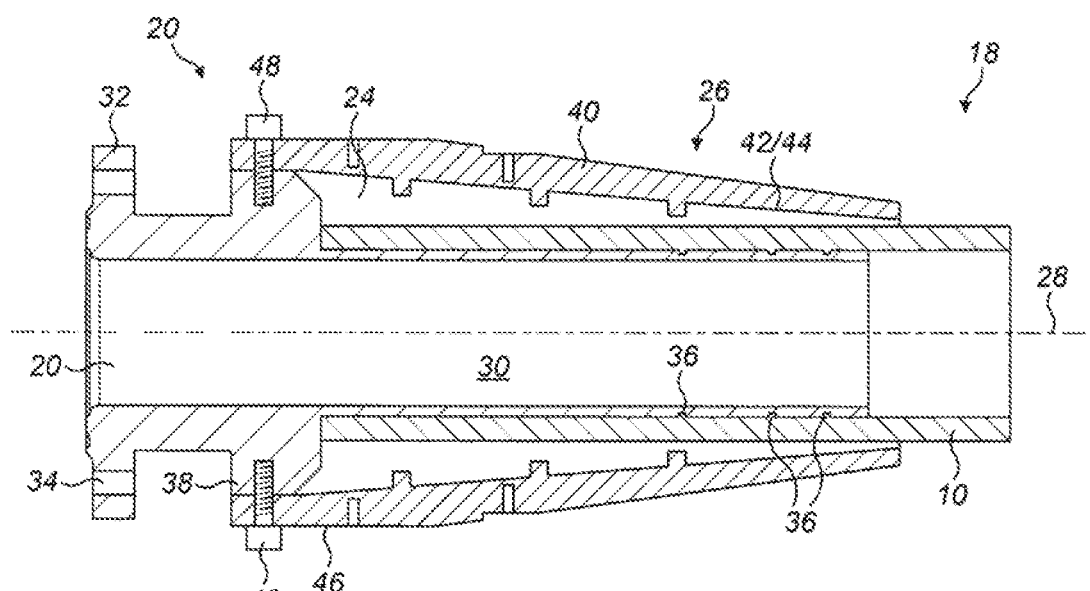
FIG. 2 is a view in longitudinal section of an end joined to a composite tube, as also known in the prior art.

As in the prior art arrangement shown in FIG. 2, the end fitting 50 comprises an elongate tubular stem 56, a wedge system 58 that serves as an inner wedge formation and a tubular frusto-conical sleeve 60 that serves as an outer wedge component. Thus, the sleeve 60 surrounds and cooperates with the wedge system 58 to lock the end fitting 50 to the tube 54.

Again, the stem 66 is an integral steel forging that rotationally symmetrical about a central longitudinal axis 28 and that has a substantially constant internal diameter along its full length. In this example, however, a joint formation exemplified by the coupling flange 32 of FIG. 2 has been omitted from the stem 56.

Similarly, the stem 55 has a tubular root portion 62 at a proximal end for engaging the composite tube 54 to secure the end fitting 50 to the tube 54. The root portion 62 is an interference fit within a distal end portion of the tube 54. The root portion 62 may be sealed to the surrounding tube 54 by a series of circumferential gaskets as shown in FIG. 2, although such gaskets have been omitted from FIG. 3.

The stem 56 extends distally from the root portion 62 to protrude distally beyond the distal end of the tube 54. Here, like the locking flange of FIG. 2, a tensioning flange 64 extends radially from the protruding end of the stem 56 and exceeds the outer diameter of the tube 54. Similarly, the tensioning flange 64 bears against the distal end of the tube 54.

The sleeve 60 is adapted relative to the prior art sleeve of FIG. 2. In particular, the distal end ring 46 of the sleeve 26 of FIG. 2 is omitted and there is at least one shoulder 66 at the proximal end of the sleeve 60. Preferably, as shown, the radial extent of the shoulder 66 does not exceed the radial extent of the distal end of the sleeve 60.

The tensioning flange 64, the wedge system 58 and the sleeve 60 are penetrated by mutually-aligned bores that together define longitudinally-extending passageways 68. Each passageway 68 extends from a proximal end at the proximal face of the shoulder 66 to a distal end at the distal face of the tensioning flange 64.

One such passageway 68 is shown on the upper side of the tube 54 in FIG. 3. It will be apparent that the passageways 68 extend substantially parallel to the central longitudinal axis 28 of the tube 54. The passageways 66 are equi-angularly spaced around that axis 28.

As shown on the lower side of the tube 54 in FIG. 3, each passageway 68 accommodates a long bolt, stud or threaded rod 70. The rod 70 protrudes longitudinally beyond the proximal face of the shoulder 66 and the distal face of the tensioning flange 64. The rod 70 is then secured and tensioned by lightening nuts 72 on its protruding ends.

There a radial clearance between each rod 70 and the surrounding walls of the associated passageway 68. This clearance is sufficient for the sleeve 60 and the wedge system 58 to move slightly in opposed radial directions with their wedging interaction as they are pulled together by the tensioned rod 70. Thus, due to tension in the rod 70, the sleeve 60 forces the wedge system 58 radially inwardly against the radially outer surface of the tube 54 to squeeze the wall of the tube 54 against the root portion 62 of the stem 56 within. This locks the end fitting 50 to the tube 54 like the prior art arrangement shown in FIG. 2.

It will be evident from FIG. 3 that as the rods 70 act longitudinally in tension, they can extend longitudinally through the tensioning flange 64. This keeps the locking system, compactly, within the outer diameter of the tensioning flange 64 and so avoids adding to the overall diameter of the end fitting 50, unlike the bolts 48 extending through the end ring 46 of the prior art arrangement of FIG. 2.

Elongate elements other than rods 70 may act longitudinally in tension to lock the sleeve 60 around the wedge system 56. For example, straps 74 equi-angularly spaced around the central longitudinal axis 28 of the tube 54 could be used instead, as in the end fitting 76 that is shown in FIG. 4 as a second embodiment of the invention. Here, like numerals are used for like features.

In the end fitting 76 of FIG. 4, the tensioning flange 64 of FIG. 3 is replaced by a support flange 78 that supports and guides the looped straps 74 to hold the straps 74 clear of the wedge system 58. The thin, flat section of the straps 74 makes it possible for the straps 74 to extend around the radially outer side of the support flange 78 without adding substantially to the outer diameter of the end fitting 78.

To enable this, opposed ends of each strap 74 are attached, respectively, to the sleeve 60 and to the part of the stem 58 that protrudes distally from the tube 54. In this example, a distal end of the strap 74 is looped around an anchor formation 80 on the stem 56, on a distal side of the support flange 78. The anchor formation 80 lies within the radial extent of the support flange 78.

Conversely, a proximal end of the strap 74 is engaged with a tensioner 82 that is attached to the sleeve 60. More specifically, the tensioner 82 is received in a bore 84 that extends through a shoulder 66 at the proximal end of the sleeve 60, as shown on the upper side of the tube 54 in FIG. 4.

The tensioner 62 comprises a threaded rod 86 that has an anchor formation 68 at its distal end for engaging the looped proximal end of the strap 74. The strap 74 is tensioned by tightening a nut 90 at the proximal end of the rod 86, which protrudes proximally beyond the shoulder 66.

It would be possible for a tensioner 82 to be at the distal end of the strap 74 instead of at the proximal end of the strap 74 or indeed to be at an intermediate location along the strap 744. However, positioning the tensioner 82 at or near to a proximal end of the strap 74 is advantageously compact because the proximally-tapering outer shape of the sleeve 60 accommodates the tensioner 82 without increasing the overall diameter of the end fitting 78.

In another variant of the second embodiment, the straps 74 could extend along passageways through the support flange 78, the wedge system 58 and the sleeve 60, like the passageways 68 shown in FIG. 3. In another variant, the support flange 78 could be omitted from the arrangement shown in FIG. 4.

Moving on now to the third and fourth embodiments of the invention shown in FIGS. 5 and 6, these embodiments show how the tensioning and locking principles of the first and second embodiments may be applied to joint fittings 92, 94 respectively. The joint fittings 92, 94 lie between successive composite tubes 54 of a pipeline to effect mechanical and fluid coupling between them. Again, like numerals are used for like features.

As the joint fittings 92, 94 shown in FIGS. 5 and 6 define the joint between the adjoining tubes 54, there is no need for a specific joint formation such as a weld neck, a thread or the coupling flange as shown in FIG. 2. Instead, a tubular stem 96 extends continuously between the adjoining tubes 54 and defines mutually-opposed root portions that are an interference fit within the mutually-opposed end portions of the respective tubes 54. Again, the stem 96 may be sealed to the surrounding tubes 54 by a series of circumferential gaskets like those shown in FIG. 2, although such gaskets have been omitted from FIGS. 5 and 6.

The end portion of each tube 54 is surrounded by a respective wedge system 58 and sleeve 60. The wedge systems 58 and sleeves 60 of the adjoining tubes 54 are in mirrored relation about the interface between the tubes 54.

It will be apparent that the wedge system 58 and sleeve 60 of FIG. 5 correspond to the same features in FIG. 3. Similarly, the wedge system 56 and sleeve 60 of FIG. 6 correspond to the same features in FIG. 4.

The joint fittings 92, 94 shown in FIGS. 5 and 6 also have a flange 98 that extends radially from the stem 96 at a longitudinally-intermediate location. The flange 98 lies between the mutually-opposed ends of the respective tubes 54, which bear against and sandwich the flange 98 between them. The flange 96 also lies between the mirrored wedge systems 58 of the respective tubes 54.

FIG. 5 shows two variants of the third embodiment, one on the upper side of the tubes 54 and one on the lower side of the tubes 54. Both variants effect wedging interaction and looking between the wedge systems 58 and the surrounding sleeves 80 by virtue of threaded rods 100, 102 that act longitudinally in tension. Like the rods 70 of FIG. 3, the rods 100, 102 extend through passageways defined by aligned bores in the wedge system 58, the sleeve 60 and the flange 98.

In the variant shown on the upper side of FIG. 5, separate rods 100 are engaged in opposed threaded blind holes in the flange 98. The flange 98 therefore acts like the tensioning flange 64 of FIG. 3, reacting against tensile forces in the rods 100 that pull the mirrored sleeves 60 toward each other over the respective wedge systems 58.

In the variant shown on the lower side of FIG. 5, a single rod 102 extends through a through-hole in the flange 98 to cooperate with the sleeves 60 on both sides of the flange 98. Thus, the passageways in the mirrored wedge systems 58 and sleeves 60 align with each other and with the through-hole in the flange 98, which simply supports the middle of the rod 102. In principle, it may be possible to omit the flange 98 in this variant if the rod 102 and the opposed wedge systems 58 may be supported adequately without it.

Turning finally to the fourth embodiment shown in FIG. 6, this shows how wedging interaction and locking between the mirrored wedge systems 58 and the surrounding sleeves 60 is effected by straps 104 that act longitudinally in tension like the straps 74 of FIG. 4. Unlike the straps 74 of FIG. 4, however, the straps 104 extend around the flange 98 to cooperate with the sleeves 60 on both sides of the flange 98.

Thus, both ends of the straps 104 are engaged with tensioners 82 like those shown in FIG. 4, which are similarly anchored to the shoulders 66 of the sleeves 60 for tightening and tensioning the straps 104.

Again, in principle, the straps 104 could extend through longitudinal passageways defined by aligned bores in the flange 98, the wedge systems 58 and the sleeves 60. However, the flange 98 could be omitted from the fourth embodiment if the straps 104 and the opposed wedge systems 58 may be supported adequately without it. Also, it would be possible to tension the straps 104 using a tensioner 82 at only one end, the other end simply being anchored directly to the associated sleeve 60. Alternatively, a tensioner 82 could be disposed centrally on a strap 104 with the ends of the strap 104 both being anchored directly to the respective sleeves 60.

In addition to the variants set out above, any other variations are possible within the inventive concept. For example, end fittings or joint fittings of the invention may be made of various materials such as carbon steel, Super Duplex stainless steel or Inconel. Also, straps could be tensioned by a separate tensioning apparatus, in which case the straps may include fastenings that hold the straps locked in a tensioned state.

It would also be possible for the wall of the tube to be shaped to perform the function of the wedge system that serves as an inner wedge formation, thus having distally-flared shape that provides for wedging interaction with the surrounding sleeve, in effect, this integrates the wedge system with the tube, Such a shape may be formed integrally by locally thickening the wall of the tube to increase its outer diameter progressively, or could instead be defined by a frosto-conical part fixed to the tube. An example of such an arrangement, in which the wedge system is integrated with the tube, is shown in FIG. 7. Aside from the integrated wedge system, the arrangement shoown in FIG. 7 is otherwise identical to the arrangement shown in FIG. 3.

The invention claimed is:

1. A rigid pipe of composite material in combination with a fitting for the pipe, the fitting comprising:
   at least one tubular root portion;
   an outer wedge component that is movable longitudinally relative to the root portion to force an opposed inner wedge formation radially inwardly toward the root portion to clamp the composite pipe between the inner wedge formation and the root portion, wherein the inner wedge formation is integral with the pipe; and
   at least two longitudinally extending tensile elements that act in tension on the outer wedge component to effect said for longitudinal movement;
   wherein the tensile elements extend along respective passageways that extend longitudinally through the outer wedge component and the inner wedge formation.

2. The combination of claim 1, wherein the inner wedge formation extends circumferentially around, and is spaced radially from, the root portion to define an annular clamping gap that, in use, accommodates a wall of the pipe.

3. The combination of claim 1, wherein the tensile elements comprise one or more rods, bolts, studs or straps, or any combination thereof.

4. The combination of claim 1, wherein at least one of the tensile elements comprises a tensioner or fastening that is offset proximally with respect to, and located on an outer proximally tapering side of, the outer wedge component.

5. The combination of claim 1, wherein the passageways also extend longitudinally through a flange that extends radially in a plane offset longitudinally from the root portion.

6. The combination of claim 1, wherein the outer wedge component is a sleeve that encircles the root portion.

7. The combination of claim 1, being an end fitting having a joint formation that is disposed distally with respect to the root portion.

8. The combination of claim 7, wherein each tensile element acts between anchorages disposed respectively on the outer wedge component and on a stem portion that extends distally from the root portion.

9. The combination of claim 7, wherein the passageways also extend longitudinally through a flange that extends radially in a plane offset longitudinally from the root portion, comprising an integral tubular stem component that defines the root portion at a proximal end, the joint formation at a distal end and the flange extending radially outwardly between those ends.

10. The combination of claim 9, wherein the flange locates the inner wedge formation against longitudinal movement.

11. The combination of claim 9, wherein each tensile element extends between the outer wedge component and the flange.

12. The combination of claim 1, wherein the composite pipe is fitted with the fitting.

* * * * *